United States Patent [19]
Maus et al.

[11] Patent Number: 5,307,626
[45] Date of Patent: May 3, 1994

[54] METHOD AND APPARATUS FOR CONTROLLING AN INTERNAL COMBUSTION ENGINE, USING THE CURRENT TEMPERATURE OF A DOWNSTREAM CATALYTIC CONVERTER

[75] Inventors: Wolfgang Maus; Helmut Swars, both of Bergisch Gladbach; Rolf Brück, Overath, all of Fed. Rep. of Germany

[73] Assignee: Emitec Gesellschaft fuer Emissionstechnologie mbH, Lohmar, Fed. Rep. of Germany

[21] Appl. No.: 947,726

[22] Filed: Sep. 18, 1992

[30] Foreign Application Priority Data

Mar. 19, 1990 [DE] Fed. Rep. of Germany ....... 4008779
Feb. 7, 1991 [DE] Fed. Rep. of Germany ....... 4103747

[51] Int. Cl.⁵ .............................................. F01N 3/28
[52] U.S. Cl. ...................................... 60/274; 60/277; 60/285; 60/300
[58] Field of Search ................... 60/274, 277, 285, 300

[56] References Cited

U.S. PATENT DOCUMENTS

| | | | |
|---|---|---|---|
| 3,785,151 | 1/1974 | Holl | 60/277 |
| 3,906,721 | 9/1975 | Micheli et al. | |
| 4,319,451 | 3/1982 | Tajima | 60/285 |
| 5,060,473 | 10/1991 | Nakagawa | 60/277 |
| 5,146,743 | 9/1992 | Maus | 60/284 |

FOREIGN PATENT DOCUMENTS

| | | |
|---|---|---|
| 0223058 | 5/1987 | European Pat. Off. |
| 0245737 | 11/1987 | European Pat. Off. |
| 0245738 | 11/1987 | European Pat. Off. |
| 0260031 | 3/1988 | European Pat. Off. |
| 2304622 | 8/1974 | Fed. Rep. of Germany |
| 2346425 | 6/1977 | Fed. Rep. of Germany |
| 2643739 | 3/1978 | Fed. Rep. of Germany |
| 3524592 | 9/1986 | Fed. Rep. of Germany |
| 3516981 | 11/1986 | Fed. Rep. of Germany |
| 3540013 | 1/1987 | Fed. Rep. of Germany |
| 3543011 | 9/1988 | Fed. Rep. of Germany |
| 56-064139 | 10/1979 | Japan |
| 62-223427 | 3/1986 | Japan |
| 01139906 | 11/1987 | Japan |
| 01232106 | 11/1988 | Japan |
| 8807622 | 10/1988 | World Int. Prop. O. |
| 8910470 | 11/1989 | World Int. Prop. O. |
| 8910471 | 11/1989 | World Int. Prop. O. |

*Primary Examiner*—Douglas Hart
*Attorney, Agent, or Firm*—Herbert L. Lerner; Laurence A. Greenberg

[57] ABSTRACT

An internal combustion engine has an engine control for processing a number of measured values received over measurement lines, converting the measured values into control data for operating the engine and carrying the control data over engine feed lines to the engine, for instance for controlling at least one of fuel injection, air delivery and ignition with the control data. A method for controlling the internal combustion engine includes directly measuring a temperature of walls or structures of a catalytic converter disposed downstream of the engine, supplying a value of the temperature to the engine control over at least one data line, processing the value of the temperature in the engine control along with other measured values and using the processed value to control the engine. An apparatus for controlling the engine and for monitoring the temperature of the catalytic converter includes at least one temperature sensor integrated on or in walls or structures of the catalytic converter. An engine control receives a number of measurement data as input variables from measurement lines and derives control data for operation of the engine from the measurement data. Engine feed lines carry the control data to the engine. At least one data line delivers measured temperature values from the catalytic converter to the engine control as input variables in addition to other input variables.

37 Claims, 3 Drawing Sheets

METHOD AND APPARATUS FOR CONTROLLING AN INTERNAL COMBUSTION ENGINE, USING THE CURRENT TEMPERATURE OF A DOWNSTREAM CATALYTIC CONVERTER

CROSS-REFERENCE TO RELATED APPLICATION:

This application is a Continuation of International Application Serial No. PCT/EP91/00519, filed Mar. 18, 1991.

The present invention relates to a method and an apparatus for controlling an internal combustion engine using the current or actual temperature of a downstream catalytic converter.

In order to meet the increasingly stringent environmental protection regulations in many countries, many internal combustion engines, particularly in motor vehicles, have lately been equipped with a catalytic converter. The catalytic converters are generally honeycomb-like bodies that have a number of channels through which exhaust gas flows. Many various embodiments of carrier bodies for the actual catalytically active material are known, in particular metal catalyst carriers of the kind described, for instance, in Published European Application No. 0 245 737, corresponding to U.S. Pat. Nos. 4,832,998 and 4,923,109 or Published European Application No. 0 245 738 corresponding to U.S. Pat. Nos. 4,803,189 and 4,946,822.

In order to control modern internal combustion engines, complex engine controls are used, which use complex programs to calculate control data on the basis of a number of measured values, such as temperature, intake pressure, rpm, and gas pedal position, which data then control various control elements on the engine, such as the fuel injection pump, the ignition, the air valves, and so forth.

The engine controls and programs used for such a purpose in the prior art take into account the fact that a catalytic converter disposed downstream of the engine should not exceed certain maximum temperatures in any operating state, in order to avoid damage to the carrier and above all to the catalytically active material. In order to assure such operation, certain conditions must be met in the engine control program, but in some operating states that means that the engine is not kept in an optimal control range in terms of emissions, performance, torque, and/or fuel consumption, even though the catalytic converter may actually still be far from its maximum allowable operating temperature.

It is accordingly an object of the invention to provide a method and an apparatus for controlling an internal combustion engine by using the current temperature of a downstream catalytic converter, which overcome the hereinafore-mentioned disadvantages of the heretofore-known methods and devices of this general type and which limit the restrictions on engine control in the prior art for protecting the catalytic converter from excess temperature as much as possible, so that the engine can more frequently be kept in an optimized state in terms of fuel consumption, torque, and/or pollutant emissions.

With the foregoing and other objects in view there is provided, in accordance with the invention, a method for controlling an internal combustion engine having an engine control for processing a number of measured values received over measurement lines, converting the measured values into control data for operating the engine and carrying the control data over engine feed lines to the engine, for instance for controlling the fuel injection, the air delivery, the ignition, and so forth, which comprises directly measuring a temperature of walls or structures of a catalytic converter disposed downstream of the engine, supplying a value of the temperature to the engine control over at least one data line, processing the value of the temperature in the engine control along with other measured values and using the processed value to control the engine.

The term "direct measurement" is understood primarily to mean the measurement of the temperatures of the walls or structures of the catalyst carrier body, but a suitable value for the engine control may also be obtained by measuring the gas temperature in the catalytic converter. The embodiment according to the invention has the advantage of ensuring that the structure of the engine control is no longer dependent to the previous extent on results obtained by tedious experiments regarding the temperature performance of the catalytic converter for the particular system type under the most varied operating conditions. Since the actual catalytic converter temperature is available as a measured value, safety margins ascertained by experimentation no longer need to be taken into account in the engine control. In particular, the engine control can be constructed primarily for optimizing the fuel consumption, for instance, and it is subject to no restrictions as long as the actual catalytic converter temperature is within the allowable range.

With earlier control methods it is unavoidable that in some operating states the engine control will carry altered control data, deviating from the optimal control data for consumption and/or performance, to the engine to protect the catalytic converter against excess temperature. In accordance with another mode of the invention, there is provided a method which comprises n longer altering the control data provisionally but rather, deviating from the optimal control data, only if the measured temperature of the catalytic converter in fact approaches a predeterminable critical value or exceeds a predeterminable threshold.

Processing the actual temperature of the catalytic converter can also have major advantages in the cold starting phase. In order to bring the catalytic converter to operating temperature rapidly, various control processes are provided in the engine control, which increase the fuel consumption and may under some circumstances make the ride less comfortable. Through the use of direct measurement and processing of the temperature of the catalytic converter, this cold starting phase can be limited precisely to the necessary extent, since the instant that the starting temperature of the catalytic converter is obtained can be detected directly. Both early termination of the cold starting phase, which is disadvantageous in terms of pollutant emissions, and late termination, which is disadvantageous in terms of fuel consumption, can be avoided as a result. This is especially true for restarting the engine after variously long interruptions in operation.

In accordance with a further mode of the invention, there is provided a method which comprises measuring the temperature in the catalytic converter with an integrally measuring temperature sensor being extended over an approximately representative region, in particular a cross-sectional and/or a longitudinal-sectional region, of the catalytic converter. Since the temperature in a catalytic converter is generally not uniformly distributed, the conclusiveness of a measurement is markedly increased if the temperature of the catalytic converter is measured by such an integrally measuring temperature sensor. A measurement is considered to be representative if it includes information both from the peripheral regions of the flow and from the central region. A cross-sectional region is a disk-shaped region in the exhaust system located approximately in a cross-sectional plane in which the measurement is carried out. Correspondingly, a longitudinal-sectional region is a disk-shaped region in the exhaust system located approximately in a longitudinal-sectional plane. However, representative regions may also be measurement planes extending obliquely or diagonally, or spiral paths of a linear measuring sensor inside the catalytic converter.

In accordance with an added mode of the invention, there is provided a method which comprises ascertaining a temperature distribution in the catalytic converter from at least two temperature sensors with an electronic monitoring apparatus, and carrying the temperature distribution or a calculated maximum value over a data line to the engine control. Depending on the demands for accuracy of the temperature measurement and other measuring systems that may be combined with the present invention, it is useful to evaluate measured temperature values from two or more temperature sensors by means of such an electronic monitoring apparatus. If two temperature sensors are used, they should preferably be disposed in the vicinity of the two end surfaces of the catalytic converter.

In accordance with an additional mode of the invention, there is provided a method which comprises simultaneously monitoring the functional capability and the operating state of the catalytic converter from the measured temperature data with the electronic monitoring apparatus, and carrying an outcome of the monitoring to a display or a data memory over a diagnosis line. By analyzing the temperature distribution in the catalytic converter and the behavior over time of the temperature, statements can be obtained as to the functional capability of the catalytic converter, the conversion rate that is still available, and the expected remaining service life of the catalytic converter.

In accordance with yet another mode of the invention, there is provided a method which comprises feeding data, such as those relating the data to at least one of rpm, intake pressure and fuel delivery, from the engine control over data feed lines to the electronic monitoring apparatus, for determining the state and/or the temperature distribution in the catalytic converter. In this way, the catalytic converter monitoring becomes especially precise, because the flow velocity in the exhaust system and other important variables can be calculated from such data.

In accordance with yet a further mode of the invention, the catalytic converter is an electrically heatable catalytic converter, and there is provided a method which further comprises additionally processing the measured temperature of the catalytic converter for regulating electric heating. This process is used for especially low-polluting motor vehicles, in order to keep the catalytic converter at a minimum temperature necessary for the pollutant conversion, and to do so as fast and as long-lastingly as possible during operation.

In accordance with yet an added mode of the invention, there is provided a method which comprises modifying the control of the engine with the engine control, such as by varying a ratio of fuel and air or by changing or retarding ignition timing, etc., only upon attainment of a critical temperature of the catalytic converter for preventing the catalytic converter temperature from rising further. This procedure, in which the engine control initially controls the engine without taking the temperature of the catalytic converter into account, is considered the most suitable embodiment of the invention. In addition, cooling provisions for the exhaust path or the catalytic converter can be initiated.

In accordance with yet an additional mode of the invention, there is provided a method which comprises monitoring behavior of the temperature of the catalytic converter over time with respect to various processes in the engine control, and drawing conclusions from the behavior as to abnormal operating states of the engine, such as misfiring. Some engine controls have so-called emergency operation programs, which are intended to prevent major damage to the vehicle in abnormal operating states but maintain the capability of continuing a trip for a short distance. The effect of such various emergency operation programs on the temperature of the catalytic converter can be ascertained within a short time by the rapid reaction of temperature sensors, and as a result an emergency operation suitable for avoiding damage to the catalytic converter can be selected. For instance, if only one cylinder is misfiring, then emergency operation programs are available that block the fuel delivery to that cylinder. For example, by briefly and individually turning off the fuel delivery to individual cylinders and with the ensuing reaction of the temperature in the catalytic converter, the cylinder responsible for the misfiring can be ascertained and its fuel delivery can be cut off.

With the objects of the invention in view, there is also provided, in an assembly having an internal combustion engine and a catalytic converter for exhaust gases of the engine, an apparatus for controlling the engine and for monitoring the temperature of the catalytic converter, comprising at least one temperature sensor integrated on or in walls or structures of the catalytic converter; measurement lines, an engine control receiving a number of measurement data as input variables from the measurement lines and deriving control data for operation of the engine from the measurement data, engine feed lines carrying the control data to the engine; and at least one data line for delivering measured temperature values from the catalytic converter to the engine control as input variables in addition to other input variables.

The essential feature according to the invention is the delivery of data from the catalytic converter to the engine control, which for the first time makes it possible to employ the above-described method of the invention. It is no longer necessary to be restricted solely to the monitoring an diagnosis of the state of the catalytic converter, although both options still remain possible. Instead, by processing the temperature of the catalytic converter in the engine control, on one hand the state of the catalytic converter can be varied and on the other hand to protect the catalytic converter, unnecessary restrictions that would otherwise be necessary for safety reasons can be avoided as long as the catalytic converter is not in fact within a critical temperature range.

In accordance with another feature of the invention, at least two temperature sensors are disposed in the catalytic converter. This is advantageous because more accurate conclusions regarding the temperature distribution in the catalytic converter can then be drawn, and additional information is available for diagnosis.

In accordance with a concomitant feature of the invention, there is provided an electronic monitoring apparatus for processing the measured temperature values from the catalytic converter electronically and only then carrying them to the engine control over the data line. The electronic monitoring apparatus can additionally assume the task of monitoring and diagnosis with respect to the condition of the catalytic converter.

In order to provide for the accuracy of measurement, it is advantageous, as will be described in further detail below in conjunction with the drawing, if the temperature sensors are planar or approximately linear, in order to attain representative outcomes of measurement. In particular, it is advantageous if the temperature sensors are extended over an approximately representative portion of a cross-sectional region of the catalytic converter.

Other features which are considered as characteristic for the invention ar set forth in the appended claims.

Although the invention is illustrated and described herein as embodied in a method and an apparatus for controlling an internal combustion engine by using the current temperature of a downstream catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
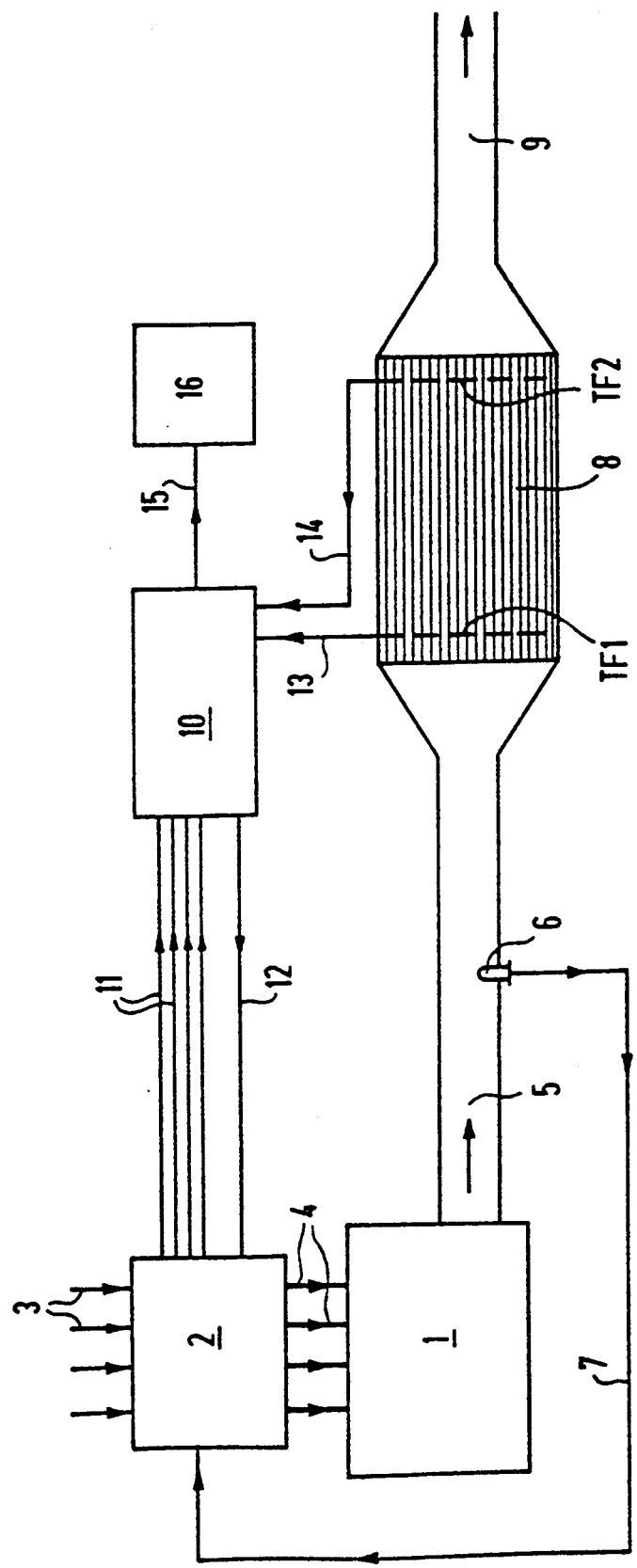
FIG. 1 is a fragmentary, diagrammatic and schematic overview of an engine control and a catalytic converter monitoring system according to the invention.

Referring now to the figures of the drawing in detail and first, particularly, to FIG. 1 thereof, there is seen an internal combustion engine 1 with an electronic engine control 2, wherein in the present description the term "engine" always means the engine and all of its peripheral equipment such as ignition, fuel injection and air delivery devices, with the exception of measuring instruments and the engine control. The engine control 2 receives information from outside through measurement value feed lines 3, and from the information it ascertains control data, which are supplied to the engine 1 through engine feed lines 4. Exhaust gases pass in the direction of an arrow, from the engine 1 into an exhaust gas line 5, in which a lambda sensor 6 is disposed. The lambda sensor 6 in turn is connected to the engine control 2 through a measured value line 7. A catalytic converter 8 is disposed in the exhaust gas line 5 and is followed by an exhaust outlet line or pipe 9. The catalytic converter 8 may include one or more individual disks and naturally the exhaust system can also be constructed as a dual or otherwise multiple system, but neither of these factors plays a decisive role for the present invention. The catalytic converter 8 may also be electrically heatable, at least in subregions, and may have corresponding electrical leads.

It is important for the present invention to note that the catalytic converter has temperature sensors TF1, TF2, which are connected to an electronic monitoring apparatus 10 by measurement lines 13, 14. In this way, the temperature of the walls or structures of the catalytic converter 8 which are represented by the sheet-metal layers 21, 22, is directly measured downstream of the engine 1. In principle, the measured temperature values could also be carried from the temperature sensors TF1, TF2 directly to the engine control 2, but in the present exemplary embodiment prior processing in the electronic monitoring apparatus 10 is preferred. This electronic monitoring apparatus 10 can ascertain a temperature distribution in the catalytic converter and/or a mean value and/or a maximum value from the measured temperature values and can carry it over a data line 12 to the engine control 2. In addition, the electronic monitoring apparatus 10 can also monitor the functional capability of the catalytic converter 8 from the measured data in the catalytic converter 8 and optionally from data from the engine control 2 delivered over data feed or supply lines 11, and carry the outcome of this monitoring to a display 16 or a memory over a diagnosis line 15.

Figure 2:
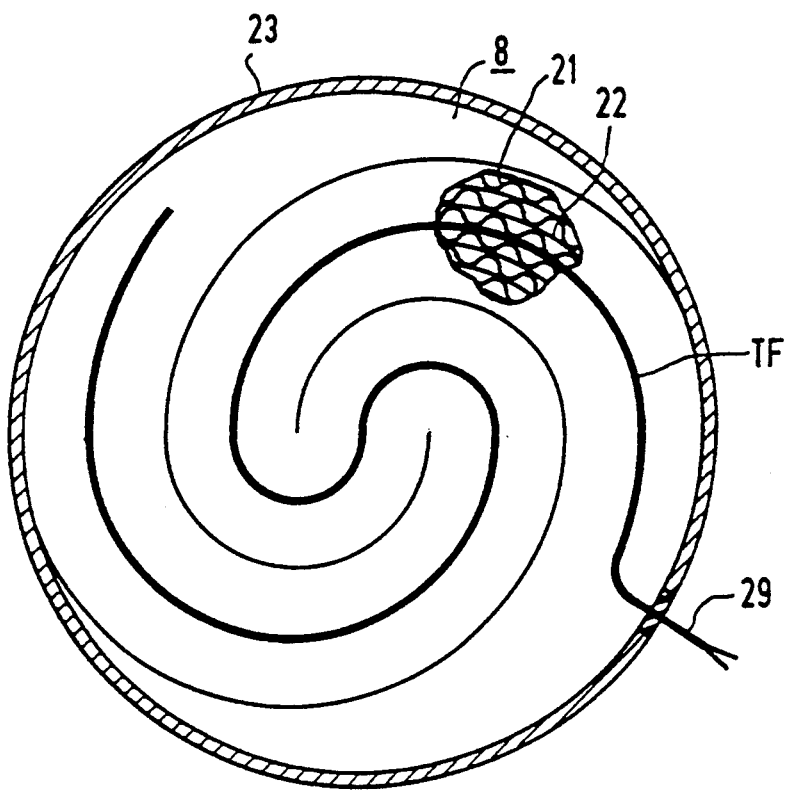
FIG. 2 is a cross-sectional view of an exemplary embodiment of a catalytic converter constructed according to the invention, at a level of a temperature sensor.
Figure 3:
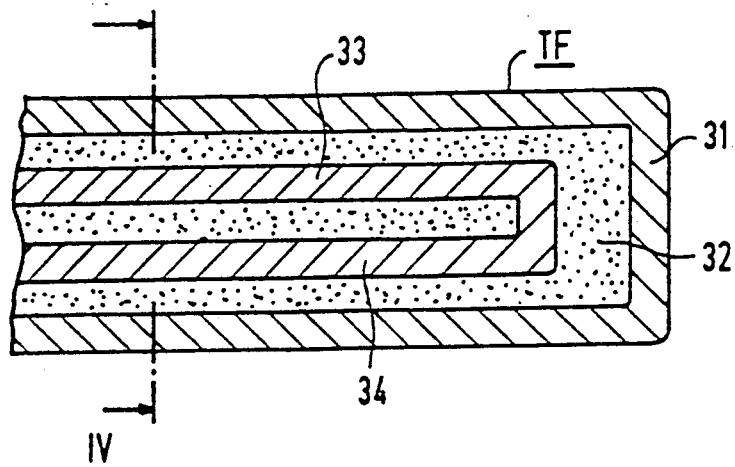
FIG. 3 is a fragmentary, longitudinal-section view
Figure 4:
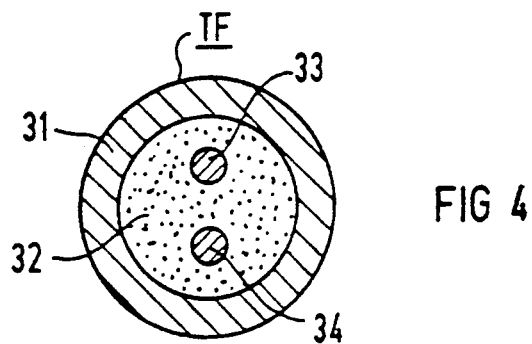
FIG. 4 is a cross-sectional view taken along the line IV—IV of FIG. 3 in the direction of the arrows, showing the structure of a suitable temperature sensor.

FIG. 2 is a fragmentary diagrammatic section through the catalytic converter 8 in the plane of a temperature sensor TF, which illustrates one possible exemplary embodiment of a catalytic converter with an integrated temperature sensor. FIG. 2 involves a configuration that is known from Published European Application No. 0 245 737, corresponding to U.S. Pat. Nos. 4,832,998 and 4,923,109. This catalytic converter 8 is assembled or built up of alternating layers of corrugated metal sheets 21 and smooth metal sheets 22. The sheet-metal layers are surrounded by a jacket 23. A temperature sensor TF, which in the present exemplary embodiment includes a wire having a resistance that varies with temperature, extends in the interior of this catalytic converter 8, parallel to the individual sheet-metal layers. In order not to require two leads for the temperature sensors at different locations, the resistor wire is installed in the shape of a U in the interior. In other words, it includes a forward line and a return line that are joined together at the end, as is shown in FIGS. 3 and 4. The temperature sensor TF is extended to the outside through the jacket 23 on one end and has leads 29 at that location for the measurement lines. The principle of the way in which a temperature sensor TF is installed in a catalytic converter 8, as is illustrated herein, is only one exemplary embodiment. Many other options for catalytic converters with different structures are conceivable, in particular those in which a temperature sensor is wound spirally or incorporated in a transverse bore. The use of a U-shaped resistor wire can also be dispensed with in many cases, if a metal jacket of the temperature sensor is used as a return line, in other words as a ground, and if the resistor wire is connected to the jacket at one end.

For purposes of illustration, FIG. 3 shows a longitudinal section through the end of the temperature sensor TF, and FIG. 4 shows a cross section taken along the line IV—IV of FIG. 3. The temperature sensor has a jacket 31, which may, for instance, be formed of "IN-CONEL" or some other high-temperature-proof steel with chromium and/or aluminum components. Depending on existing requirements, the jacket 31 may also be formed of the same material as the metal sheets of the catalytic converter 8, which makes for a problem-free soldering together of the temperature sensor TF and the metal sheets 21, 22 or the jacket 23. A wire 33, 34 is installed in the shape of a U in the interior of the temperature sensor TF. The wire may, for instance, be formed of nickel or another material that has a resistance which is strongly dependent on temperature. In a known manner, an insulating layer 32, for instance of magnesium oxide powder, prevents contact of the two lines 33, 34 of the resistor wire, both with one another and with the jacket 31.

Figure 5:
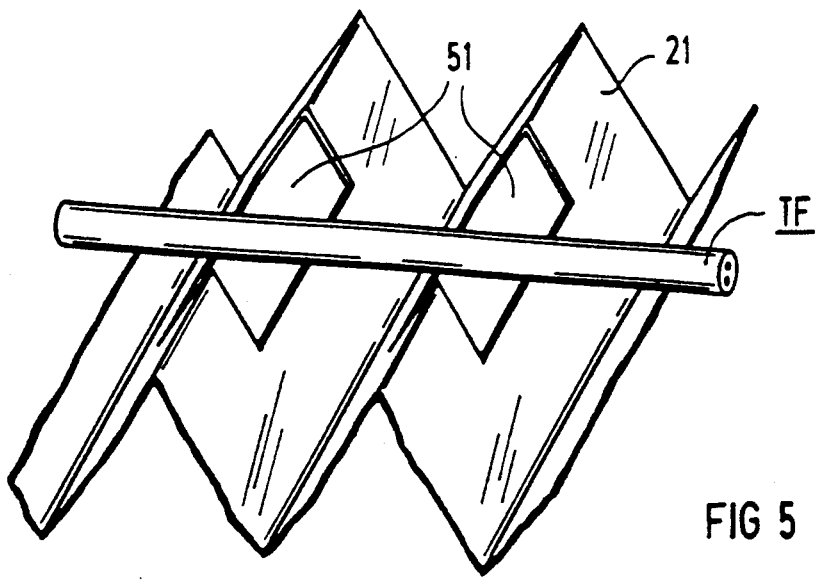
FIG. 5 is a fragmentary, perspective view of an example of a way in which a temperature sensor is technically fastened to a catalytic converter body.

FIG. 5 illustrates a small portion of a corrugated or in the present cases folded, metal sheet of the kind used to build up or assemble catalyst carrier bodies. A receptacle for a temperature sensor TF can be created by means of a suitable groove formed in the crests of the corrugations in a direction crosswise to the course of the structure. This makes it possible to layer or wind or loop or intertwine the temperature sensor together with the structured metal sheet 21 to make a catalyst carrier body. The groove 51 should not be substantially larger than the cross section of the temperature sensor, as is shown herein for illustration purposes, but should instead have about the same dimensions, so that the temperature sensor TF can be soldered in or at least fixed in place by means of the groove. If the depth of the groove 51 is less and if soldering or intimate bonding to the next adjacent smooth metal sheet is performed, it is possible to have the temperature sensor TF measure primarily the temperature of the carrier structure. However, if the groove is deeper, the temperature sensor TF can also measure the gas temperature. It is therefore possible to provide a flexible construction to meet given requirements.

The present invention is especially suitable for advanced integral diagnostic and monitoring systems in motor vehicles, which have internal combustion engines with electronic injection and are equipped with regulated catalytic converters. The invention is also especially usable in connection with electrically heatable catalytic converters. Through the use of the invention, the times when an engine must be operated under conditions that are not optimal in terms of fuel consumption are shortened, without risk to the catalytic converter, and the fuel consumption is thus reduced.

We claim:

1. A method for controlling an internal combustion engine having an engine control for processing a number of measured values received over measurement lines, converting the measured values into control data for operating the engine and carrying the control data over engine feed lines to the engine, which comprises:
    directly measuring a temperature of walls of a catalytic converter, the walls carrying a catalyst substance and being disposed inside a jacket housing downstream of the engine, supplying a value of the temperature of the walls to the engine control over at least one data line, processing the value of the temperature of the walls in the engine control along with other measured values and using the processed value to control the engine.

2. The method according to claim 1, which comprises controlling at least one of fuel injection, air delivery and ignition with the control data.

3. The method according to claim 1, wherein in some operating states the engine control carries altered control data deviating from optimal control data for at least one of consumption and performance, to the engine to protect the catalytic converter against excess temperature, and the method further comprises altering the control data to deviate from optimal control data only if the measured temperature of the catalytic converter actually approaches a predeterminable critical value or exceeds a predeterminable threshold value.

4. The method according to claim 1, which comprises measuring the temperature in the catalytic converter with an integrally measuring temperature sensor being extended over an approximately representative region of the catalytic converter.

5. The method according to claim 4, which comprises extending the temperature sensor over at least one of a cross-sectional and a longitudinal-sectional region of the catalytic converter.

6. The method according to claim 1, which comprises ascertaining a temperature distribution in the catalytic converter from at least two temperature sensors with an electronic monitoring apparatus, and carrying the temperature distribution or a calculated maximum value over a data line to the engine control.

7. The method according to claim 6, which comprises simultaneously monitoring the functional capability and the operating state of the catalytic converter from the measured temperature data with the electronic monitoring apparatus, and carrying an outcome of the monitoring to a display or a data memory over a diagnosis line.

8. The method according to claim 6, which comprises feeding data from the engine control over data feed lines to the electronic monitoring apparatus, for determining at least one of the state and the temperature distribution in the catalytic converter.

9. The method according to claim 8, which comprises relating the data to at least one of rpm, intake pressure and fuel delivery.

10. The method according to claim 1, wherein the catalytic converter is an electrically heatable catalytic converter, and the method further comprises additionally processing the measured temperature of the catalytic converter for regulating electric heating.

11. The method according to claim 1, which comprises modifying the control of the engine with the engine control only upon attainment of a critical temperature of the catalytic converter for preventing the catalytic, converter temperature from rising further.

12. The method according to claim 11, which comprises modifying the control of the engine with the engine control by varying a ratio of fuel and air.

13. The method according to claim 11, which comprises modifying the control of the engine with the engine control by retarding ignition timing.

14. The method according to claim 1, which comprises monitoring behavior of the temperature of the catalytic converter over time, and drawing conclusions from the behavior as to abnormal operating states of the engine.

15. The method according to claim 1, which comprises monitoring behavior of the temperature of the catalytic converter over time, and drawing conclusions from the behavior as to misfiring of the engine.

16. In an assembly having an internal combustion engine and a catalytic converter for exhaust gases of the engine, the catalytic converter having walls and structures carrying a catalyst material and being disposed in a jacket housing, an apparatus for controlling the engine and for monitoring the temperature of the catalytic converter, comprising:
  a) at least one temperature sensor integrated at one of the walls and the structures of the catalytic converter for directly measuring a temperature of the walls and the structures carrying a catalyst material;
  b) measurement lines, an engine control receiving a number of measurement data as input variables from said measurement lines and deriving control data for operation of the engine from the measurement data, engine feed lines carrying the control data to the engine; and
  c) at least one data line for delivering measured temperature values from the catalytic converter to said engine control as input variables in addition to other input variables.

17. The apparatus according to claim 16, wherein said at least one temperature sensor is integrated on the walls of the catalytic converter.

18. The apparatus according to claim 16, wherein said at least one temperature sensor is integrated in the walls of the catalytic converter.

19. The apparatus according to claim 16, wherein said at least one temperature sensor is integrated on the structures of the catalytic converter.

20. The apparatus according to claim 16, wherein said at least one temperature sensor is integrated in the structures of the catalytic converter.

21. The apparatus according to claim 16, wherein said at least one temperature sensor is at least two temperature sensors disposed in the catalytic converter.

22. The apparatus according to claim 16, including an electronic monitoring apparatus for electronically processing the measured temperature values from the catalytic converter and only then carrying them over said at least one data line to the engine control.

23. A method for controlling an internal combustion engine having an engine control for processing a number of measured values received over measurement lines, converting the measured values into control data for operating the engine and carrying the control data over engine feed lines to the engine, which comprises:
  directly measuring a temperature of catalyst-carrying structures of a catalytic converter disposed inside a jacket housing downstream of the engine, supplying a value of the temperature of the catalyst-carrying structures to the engine control over at least one data line, processing the value of the temperature of the catalyst-carrying structures in the engine control along with other measured values and using the processed value to control the engine.

24. The method according to claim 23, which comprises controlling at least one of fuel injection, air delivery and ignition with the control data.

25. The method according to claim 23, wherein in some operating states the engine control carries altered control data deviating from optimal control data for at least one of consumption and performance, to the engine to protect the catalytic converter against excess temperature, and the method further comprises altering the control data to deviate from optimal control data only if the measured temperature of the catalytic converter actually approaches a predeterminable critical value or exceeds a predeterminable threshold value.

26. The method according to claim 23, which comprises measuring the temperature in the catalytic converter with an integrally measuring temperature sensor being extended over an approximately representative region of the catalytic converter.

27. The method according to claim 26, which comprises extending the temperature sensor over at least one of a cross-sectional and a longitudinal-section region of the catalytic converter.

28. The method according to claim 23, which comprises ascertaining a temperature distribution in the catalytic converter from at least two temperature sensors with an electronic monitoring apparatus, and carrying the temperature distribution or a calculated maximum value over a data line to the engine control.

29. The method according to claim 23, which comprises simultaneously monitoring the functional capability and the operating state of the catalytic converter from the measured temperature data with the electronic monitoring apparatus, and carrying an outcome of the monitoring to a display or a data memory over a diagnosis line.

30. The method according to claim 29, which comprises feeding data from the engine control over data feed lines to the electronic monitoring apparatus, for determining at least one of the state and the temperature distribution in the catalytic converter.

31. The method according to claim 30, which comprises relating the data to at least one of rpm, intake pressure and fuel delivery.

32. The method according to claim 23, wherein the catalytic converter is an electrically heatable catalytic converter, and the method further comprises additionally processing the measured temperature of the catalytic converter for regulating electric heating.

33. The method according to claim 23, which comprises modifying the control of the engine with the engine control only upon attainment of a critical temperature of the catalytic converter for preventing the catalytic converter temperature from rising further.

34. The method according to claim 33, which comprises modifying the control of the engine with the engine control by varying a ratio of fuel and air.

35. The method according to claim 33, which comprises modifying the control of the engine with the engine control by retarding ignition timing.

36. The method according to claim 23, which comprises monitoring behavior of the temperature of the catalytic converter over time, and drawing conclusions from the behavior as to abnormal operating states of the engine.

37. The method according to claim 23, which comprises monitoring behavior of the temperature of the catalytic converter over time, and drawing conclusions from the behavior as to misfiring of the engine.

* * * * *